March 15, 1938. S. KRON 2,111,368
TILTING CAMERA SUPPORT
Filed Nov. 17, 1936
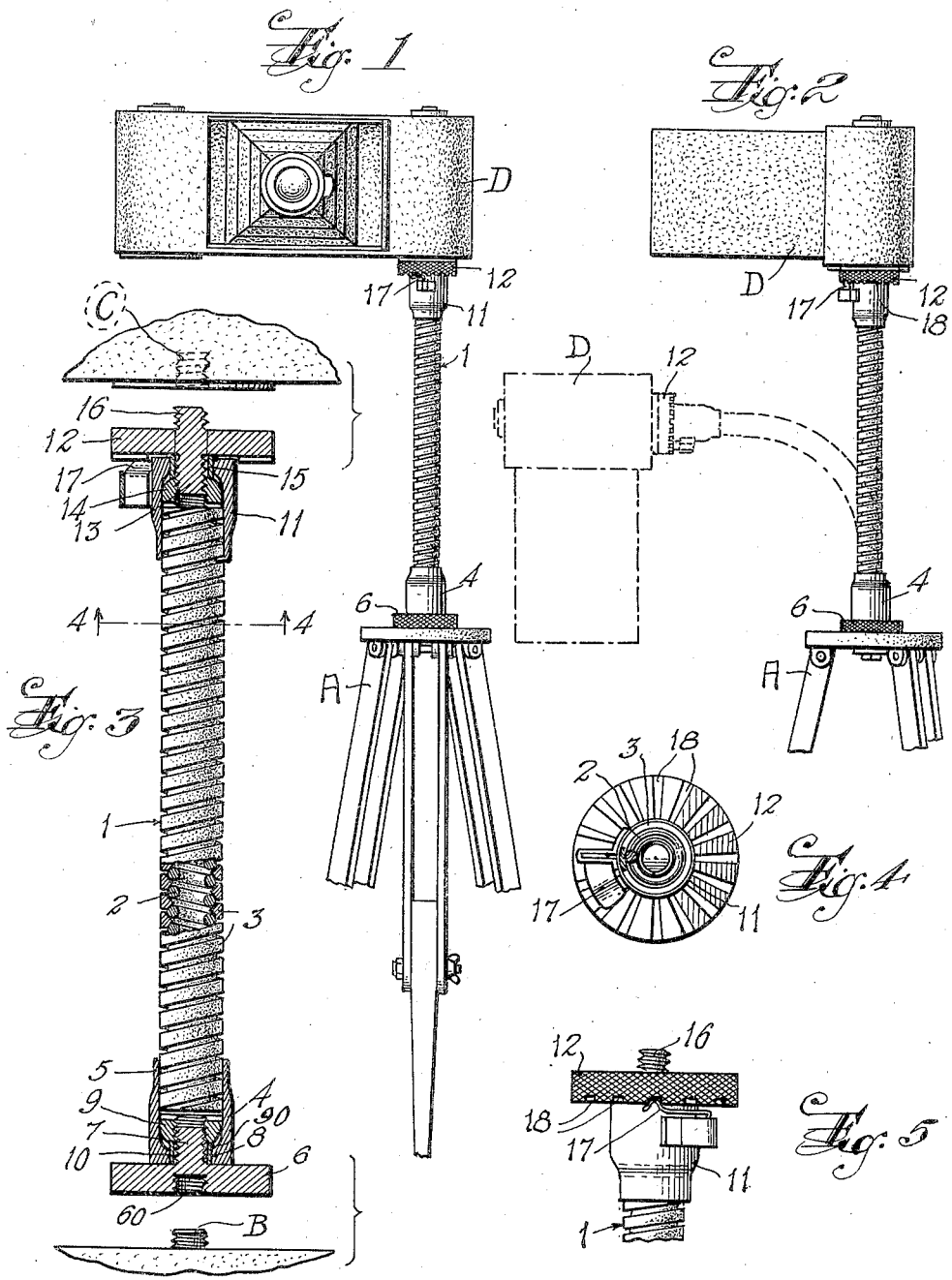
INVENTOR
Saul Kron,
BY
Harry B. Rook,
ATTORNEY Patented Mar. 15, 1938

2,111,368

UNITED STATES PATENT OFFICE 2,111,368

TILTING CAMERA SUPPORT

Saul Kron, Passaic, N. J.

Application November 17, 1936, Serial No. 111,195

7 Claims. (Cl. 248—160)

This invention relates to a device for mounting a camera on a tripod, rail, natural object or other support whereby the camera may be tilted to any desired angle to facilitate focusing the camera.

Tiltable camera supports of this general nature are known in the art, but include pivotally connected parts and clamping screws for holding the parts in adjusted position so that the devices require patience and considerable time in adjusting them and are expensive.

One object of the present invention is to provide a tiltable camera support whereby the camera can be tilted by a simple bending or twisting operation and can be held in the desired position without the necessity for special care or manipulation of nuts, screws, and the like.

Other objects are to provide such a device which shall be simple and inexpensive in construction; to provide such a device which can be easily and quickly connected to a tripod or other support and to a camera, and to obtain other advantages and results as will be brought out by the following description.

Referring to the accompanying drawing in which corresponding and like parts are designated by the same reference characters throughout the several views, Figure 1 is a side elevation of a tiltable camera support embodying my invention showing it in connection with a tripod and a known type of camera.

Figure 2 is a similar view taken from a position at right angles to that of Figure 1, and showing the camera tilted in dot and dash lines.

Figure 3 is an enlarged composite side elevational and sectional view of the camera support.

Figure 4 is a horizontal sectional view on the line 4—4 of Figure 3, and

Figure 5 is an enlarged side elevational view of the head of the support observing the same from a position at right angles to that shown in Figure 3.

Specifically describing the illustrated embodiment of the invention, the reference character A designates a known type of tripod having the usual threaded stud B to fit the usual threaded socket C in the casing of a camera D.

The tiltable support embodying the invention includes a non-resiliently flexible or pliable shank 1 which may be of any suitable construction to permit the shank to be bent and twisted and remain in bent or twisted position at the will of the operator. For example, the shank may comprise concentric inner and outer flexible and extensible portions in frictional contact with each other, so that the two portions may be bent together and the frictional engagement between them will hold them in bent condition. As shown, the shank is of known construction, including a helical inner coil 2 for example of round wire, and a helical outer coil 3 the convolutions of which are disposed between, partially overlie, and frictionally engage the convolutions of the inner coil 2.

At one end of the shank is a foot for connecting the shank to the tripod or other support. As shown, this foot comprises a sleeve 4 secured concentrically to the shank as by spinning or swaging as at 5, and a clamping plate 6 having a coaxial swivel connection with the sleeve. This swivel connection consists of a threaded coaxial stud 7 on the plate which passes through an opening 8 in the sleeve and has a clamping nut 9 threaded thereon within the sleeve to engage an inwardly facing shoulder 90, a spacing bushing 10 being interposed between the nut 9 and the sleeve 4 and being clamped between the clamping plate 6 and the nut 9, whereby the clamping plate may freeely rotate on the sleeve 4. The plate 6 has a coaxial threaded socket 60 to receive the stud B on the tripod.

At the other end of the shank is provided a head to be connected to a camera. As shown, this head includes a sleeve 11 like the sleeve 4 and a clamping plate 12 swivel-connected coaxially to the sleeve in the same manner that the clamping plate 6 is connected to the sleeve 4, the plate 12 having a stud 13 on which is threaded a nut 14 within the sleeve 11 and a bushing 15 corresponding to the bushing 10 being interposed between the sleeve 11 and the stud 13 and clamped between the nut 14 and the plate 12. The plate 12 also carries a threaded stud 16 to fit the socket C in the camera.

In use, the tiltable support is connected to the tripod by screwing the clamping plate 6 on the stud B. The stud 16 of the head clamping plate 12 may then be screwed into the socket C of the camera, whereupon the camera is mounted on the tiltable support which is in turn mounted on the tripod as shown in Figures 1 and 2. The camera may then be tilted into the desired position by simply bending or twisting the shank, for example, as shown by dot and dash lines in Figure 2 and the shank will hold the camera in this position until the shank is again adjusted. Also the camera may be rotated about either or both of the swivel connections between the shank and the foot and head clamping plates 6 and 12 respectively.

In some cameras the socket C is disposed at one end of the camera casing, as shown. In such cases, when the camera is tilted, for example, as shown in Figure 2, there is a tendency for the camera to rotate by action of gravity due to the location of the center of gravity in eccentric relation to the axis of rotation of the clamping plate 12. To prevent this and hold the camera in the desired position, I may utilize a pawl and ratchet mechanism which as shown includes a spring pawl 17 mounted on the sleeve 11 and cooperating with ratchet notches 18 in the adjacent end of the clamping plate 12. This arrangement, while holding the camera in the desired position, will permit adjustment of the camera at the will of the operator by simple forcible rotation of the clamping plate 12.

It will be understood by those skilled in the art that the specific details of structure are primarily for the purpose of illustrating the principles of the invention and that the foot portions and head portions may be connected to the shank 1 in other ways than those illustrated and described.

Furthermore, the foot portion may be modified so that it may be connected to a rail, or a natural object such as a tree or other available support, for example by making the foot portion in the form of a clamp. In this connection, while I have shown the foot portion as having a swivel relation to the shank, it will be understood that the foot portion might be rigidly connected to the shank.

Having thus described my invention, what I claim is:

1. A tiltable camera mount including a shank, a sleeve having one end fixedly mounted concentrically on one end of said shank, a clamping plate swivel mounted on the other end of said sleeve whereby said plate may rotate on said sleeve, a coaxial screw threaded stud on said plate to fit a socket in a camera, and means for connecting said shank to a support.

2. A tiltable camera mount including a shank, a sleeve having one end fixedly mounted concentrically on one end of said shank, and having an interior inwardly facing shoulder, a clamping plate having a coaxial stud rotatably fitted into the other end of said sleeve, means on said stud and engaging said shoulder on the sleeve to connect the plate to the sleeve whereby said plate can rotate on said sleeve, a coaxial screw threaded stud on said plate to fit a socket in a camera, and means for connecting said shank to a support.

3. The tiltable camera mount set forth in claim 1 with the addition of a pawl and ratchet one mounted on said sleeve and the other on said clamping plate to restrain relative swivel action of said plate and said shank.

4. A tiltable camera mount including a continuous flexible shank capable of being bent at different points in its length and remaining in bent condition at the will of the user, a sleeve for each end of the shank having one end fixedly connected concentrically to the corresponding end of the shank, and a clamping plate swivel connected coaxially to each sleeve, said clamping plates being formed respectively for separable connection to a camera and to a support.

5. A tiltable camera mount including a shank, means for connecting said shank to a support, means swivel connected to said shank for connecting a camera to said shank, a pawl and a cooperating ratchet, one mounted on the last-named means and the other mounted on said shank for restraining relative swivel action of the last-named means and said shank.

6. A tiltable camera mount including a shank, means for connecting said shank to a support, a clamping plate swivel-connected to and coaxial with said shank for connection to a camera, and a pawl and ratchet, one carried by said clamping plate and the other carried by said shank for restraining relative swivel action of said clamping plate and said shank.

7. A tiltable camera support including a flexible shank capable of being manually bent and remaining in bent condition at the will of the user, a sleeve having one end fixedly connected to one end of said shank, a clamping plate swivel connected coaxially to the other end of said sleeve and formed for connection to a camera for mounting a camera on said support, means for releasably restraining relative swivel action of said clamping plate and said sleeve, and means for connecting said shank to a support.

SAUL KRON.